United States Patent
Tsai et al.

(10) Patent No.: US 10,146,477 B2
(45) Date of Patent: *Dec. 4, 2018

(54) COMMAND QUEUING

(71) Applicant: Micron Technology, Inc., Boise, ID (US)

(72) Inventors: Victor Y. Tsai, Palo Alto, CA (US); Danilo Caraccio, Buonalbergo (IT); Daniele Balluchi, Cernusco Sul Naviglio (IT); Neal A. Galbo, Boca Raton, FL (US); Robert Warren, Loveland, CO (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/246,735

(22) Filed: Aug. 25, 2016

(65) Prior Publication Data

US 2016/0364179 A1     Dec. 15, 2016

Related U.S. Application Data

(63) Continuation of application No. 14/181,089, filed on Feb. 14, 2014, now Pat. No. 9,454,310.

(51) Int. Cl.
*G06F 3/06* (2006.01)

(52) U.S. Cl.
CPC ............ *G06F 3/0659* (2013.01); *G06F 3/061* (2013.01); *G06F 3/0611* (2013.01); *G06F 3/0679* (2013.01); *G06F 3/0688* (2013.01)

(58) Field of Classification Search
CPC .... G06F 3/0611; G06F 3/0659; G06F 3/0685; G06F 3/06; G06F 12/0246; G06F 3/0679;

(Continued)

(56) References Cited

U.S. PATENT DOCUMENTS 5,469,548 A * 11/1995 Callison ............... G06F 3/0601
                                                        710/110
5,504,868 A    4/1996 Krakirian
(Continued)

FOREIGN PATENT DOCUMENTS

CN          1732702 A      2/2006
JP       2009-518759 A     5/2009
(Continued)

OTHER PUBLICATIONS

Micron Technology, Inc., TN-29-18: Booting from Embedded MMC Introduction, found at www.micron.com/~/media/Documents/Products/Technical%20Note/NAND%20Flash/tn2918.pdf, last revised in Jun. 2008, 16 pages.

(Continued)

*Primary Examiner* — Shawn X Gu
*Assistant Examiner* — Jean C Edouard
(74) *Attorney, Agent, or Firm* — Brooks, Cameron & Huebsch, PLLC

(57) ABSTRACT

The present disclosure includes apparatuses and methods for command queuing. A number of embodiments include receiving a queued command request at a memory system from a host, sending a command response from the memory system to the host that indicates the memory system is ready to receive a command in a command queue of the memory system, and receiving, in response to sending the command response, a command descriptor block for the command at the memory system from the host.

20 Claims, 6 Drawing Sheets

(58) Field of Classification Search
CPC ..... G06F 2212/2022; G06F 2212/7211; G11C 16/102
USPC ...................................................... 711/103
See application file for complete search history.

(56) References Cited

U.S. PATENT DOCUMENTS

| | | | |
|---|---|---|---|
| 5,603,066 A | 2/1997 | Krakirian | |
| 7,630,369 B1* | 12/2009 | Overby | H04L 47/10 370/389 |
| 7,644,205 B1* | 1/2010 | Overby | G06F 13/385 709/227 |
| 8,176,232 B2 | 5/2012 | Tedrow et al. | |
| 8,296,467 B2 | 10/2012 | Lee et al. | |
| 8,386,699 B2 | 2/2013 | Yeh | |
| 8,423,722 B1 | 4/2013 | Deforest et al. | |
| 8,468,319 B1 | 6/2013 | Satran | |
| 8,904,094 B2 | 12/2014 | Matsukawa et al. | |
| 8,918,600 B2 | 12/2014 | Galbo et al. | |
| 2002/0009075 A1* | 1/2002 | Fesas, Jr. | H04L 12/40006 370/363 |
| 2004/0127255 A1 | 7/2004 | Becker et al. | |
| 2005/0114460 A1* | 5/2005 | Chen | G06F 9/5038 709/207 |
| 2006/0095686 A1 | 5/2006 | Miller et al. | |
| 2006/0179179 A1* | 8/2006 | Suzuoki | G06F 13/28 710/22 |
| 2006/0271739 A1* | 11/2006 | Tsai | G06F 3/0611 711/123 |
| 2007/0016702 A1* | 1/2007 | Pione | G06F 3/061 710/62 |
| 2007/0226401 A1* | 9/2007 | Huang | G06F 11/1068 711/103 |
| 2008/0040519 A1* | 2/2008 | Starr | H04L 49/90 710/39 |
| 2008/0140972 A1* | 6/2008 | Kim | G06F 21/79 711/164 |
| 2008/0147893 A1* | 6/2008 | Marripudi | G06F 3/0613 710/5 |
| 2008/0162735 A1* | 7/2008 | Voigt | G06F 3/0605 710/6 |
| 2009/0228535 A1* | 9/2009 | Rathi | G06F 3/048 |
| 2010/0115152 A1* | 5/2010 | Day | G06F 13/385 710/22 |
| 2010/0250785 A1* | 9/2010 | Shin | G06F 3/0613 710/3 |
| 2010/0262721 A1* | 10/2010 | Asnaashari | G06F 13/161 710/5 |
| 2010/0262979 A1* | 10/2010 | Borchers | G06F 9/544 719/321 |
| 2010/0312973 A1* | 12/2010 | Galbo | G06F 13/1642 711/154 |
| 2011/0066837 A1* | 3/2011 | Lee | G06F 9/4401 713/2 |
| 2011/0161543 A1 | 6/2011 | van Holder et al. | |
| 2011/0276725 A1* | 11/2011 | Yun | G06F 3/0611 710/15 |
| 2012/0011335 A1* | 1/2012 | Asnaashari | G06F 13/161 711/155 |
| 2012/0179860 A1* | 7/2012 | Falanga | G11C 16/102 711/103 |
| 2012/0284587 A1 | 11/2012 | Yu et al. | |
| 2012/0324180 A1* | 12/2012 | Asnaashari | G06F 13/161 711/155 |
| 2013/0036339 A1* | 2/2013 | Shiraishi | G06F 12/04 714/763 |
| 2013/0060981 A1* | 3/2013 | Horn | G06F 13/16 710/107 |
| 2013/0067143 A1* | 3/2013 | Hasegawa | G06F 3/0611 711/103 |
| 2013/0073795 A1* | 3/2013 | Hasegawa | G06F 13/16 711/103 |
| 2013/0124932 A1 | 5/2013 | Schuh et al. | |
| 2013/0145085 A1* | 6/2013 | Yu | G06F 12/0246 711/103 |
| 2013/0205073 A1* | 8/2013 | Hwang | G11C 16/10 711/103 |
| 2013/0262745 A1* | 10/2013 | Lin | G06F 3/061 711/103 |
| 2013/0326141 A1* | 12/2013 | Marcu | G06F 13/385 711/115 |
| 2014/0281151 A1* | 9/2014 | Yu | G06F 1/30 711/103 |
| 2014/0351456 A1* | 11/2014 | Sharifie | G06F 3/0613 710/5 |
| 2015/0074294 A1* | 3/2015 | Shacham | G06F 13/4243 710/5 |
| 2015/0160893 A1* | 6/2015 | Gorobets | G06F 3/061 711/103 |

FOREIGN PATENT DOCUMENTS

| | | |
|---|---|---|
| JP | 2011-018431 A | 1/2011 |
| JP | 2012-529103 A | 11/2012 |
| JP | 2014-016735 A | 1/2014 |
| TW | 201104440 A | 2/2011 |
| WO | 2007076214 | 7/2007 |
| WO | 2013111019 A2 | 8/2013 |

OTHER PUBLICATIONS

Samsung, eMMC Capacities Up to 128GB, found at http://www.samsung.com/us/business/oem-solutions/pdfs/eMMC_Product%20Overview.pdf, printed Jun. 2012, 2 pages.

Micron Technology, Inc., e-MMC Memory for the Embedded World, found at http://www.micron.com/products/managed-nand/e-mmc, as accessed Aug. 28, 2013, 3 pages.

International Search Report and Written Opinion from related international application No. PCT/US2015/015612, dated May 21, 2015, 13 pp.

Office Action from related Taiwanese patent application No. 104105193, dated Dec. 7, 2015, 12 pp.

Second Office Action from related Chinese patent application No. 201580008744.0, dated Jul. 31, 2017, 12 pp.

Extended Search Report from related European patent application No. 15749451.9, dated Sep. 18, 2017, 5 pp.

Third Office Action from related Chinese patent application No. 201580008744.0, dated Jan. 22, 2018, 13 pp.

* cited by examiner

| | | | | | | | 545 |
|---|---|---|---|---|---|---|---|
| DATA TRANSFER REQUEST HEADER 552 / 551 | | | | | | | |
| 0 | RESERVED | 1 | RESERVED | 2 | TRANSFER DIRECTION | 3 | COMMAND TAG |
| 4 | RESERVED | 5 | RESERVED | 6 | RESERVED | 7 | RESERVED |
| 8 | RESERVED | 9 | RESERVED | 10 | RESERVED | 11 | RESERVED |
| 12 | DATA BUFFER OFFSET | 13 | DATA BUFFER OFFSET | 14 | COMMAND TRANSFER LENGTH | 15 | COMMAND TRANSFER LENGTH |
| 16 | RESERVED | 17 | RESERVED | 18 | RESERVED | 19 | RESERVED |
| 20 | RESERVED | 21 | RESERVED | 22 | RESERVED | 23 | RESERVED |
| 24 | RESERVED | 25 | RESERVED | 26 | RESERVED | 27 | RESERVED |
| 28 | RESERVED | 29 | RESERVED | 30 | RESERVED | 31 | RESERVED |

COMMAND QUEUING

PRIORITY INFORMATION

This application is a Continuation of U.S. application Ser. No. 14/181,089 filed Feb. 14, 2014, the specification of which is incorporated herein by reference.

TECHNICAL FIELD

The present disclosure relates generally to semiconductor memory and methods, and more particularly, to command queuing.

BACKGROUND

Memory devices are typically provided as internal, semiconductor, integrated circuits and/or external removable devices in computers or other electronic devices. There are many different types of memory including volatile and non-volatile memory. Volatile memory can require power to maintain its data and can include random-access memory (RAM), dynamic random access memory (DRAM), and synchronous dynamic random access memory (SDRAM), among others. Non-volatile memory can retain stored data when not powered and can include NAND flash memory, NOR flash memory, phase change random access memory (PCRAM), resistive random access memory (RRAM), spin torque transfer random access memory (STTRAM) and magnetic random access memory (MRAM), among others.

Memory devices can be combined together to form memory systems, such as memory cards, as embedded storage solutions, or as a solid state drive, for example that include memory devices. Memory systems, such as a memory card, can include non-volatile memory, e.g., NAND flash memory and/or NOR flash memory, and/or can include volatile memory, e.g., DRAM and/or SRAM, among various other types of non-volatile and volatile memory. Flash memory devices can include memory cells storing data in a charge storage structure such as a floating gate, for instance, and may be utilized as non-volatile memory for a wide range of electronic applications. Flash memory devices typically use a one-transistor memory cell that allows for high memory densities, high reliability, and low power consumption.

Memory systems can be used as portable memory or embedded storage solutions that are used with a number of hosts in computing systems and/or to replace hard disk drives as the main storage device for a computing system, as the solid state drive can have advantages over hard drives in terms of performance, size, weight, ruggedness, operating temperature range, and power consumption. For example, memory systems can have superior performance when compared to magnetic disk drives due to their lack of moving parts, which may avoid seek time, latency, and other electro-mechanical delays associated with magnetic disk drives. Memory system manufacturers can use non-volatile memory to create memory systems that may not use an internal battery supply, thus allowing the drive to be more versatile and compact.

A memory system can include a number of memory devices, e.g., a number of memory chips. As one of ordinary skill in the art will appreciate, a memory chip can include a number of dies and/or logical units (LUNs), e.g., where a LUN can be one or more die. Each die can include a number of memory arrays and peripheral circuitry thereon. The memory arrays can include a number of memory cells organized into a number of physical pages, and the physical pages can be organized into a number of blocks. An array of flash memory cells can be programmed a page at a time and erased a block at a time. Operations, such as read, write, and erase operations, performed on a memory system can be limited by the amount resources available in the memory system to manage operations by the memory devices in the memory system.

BRIEF DESCRIPTION OF THE DRAWINGS

FIG. 5 illustrates an example of a data transfer request header included in a data transfer request in accordance with a number of embodiments of the present disclosure.

DETAILED DESCRIPTION

Figure 1:
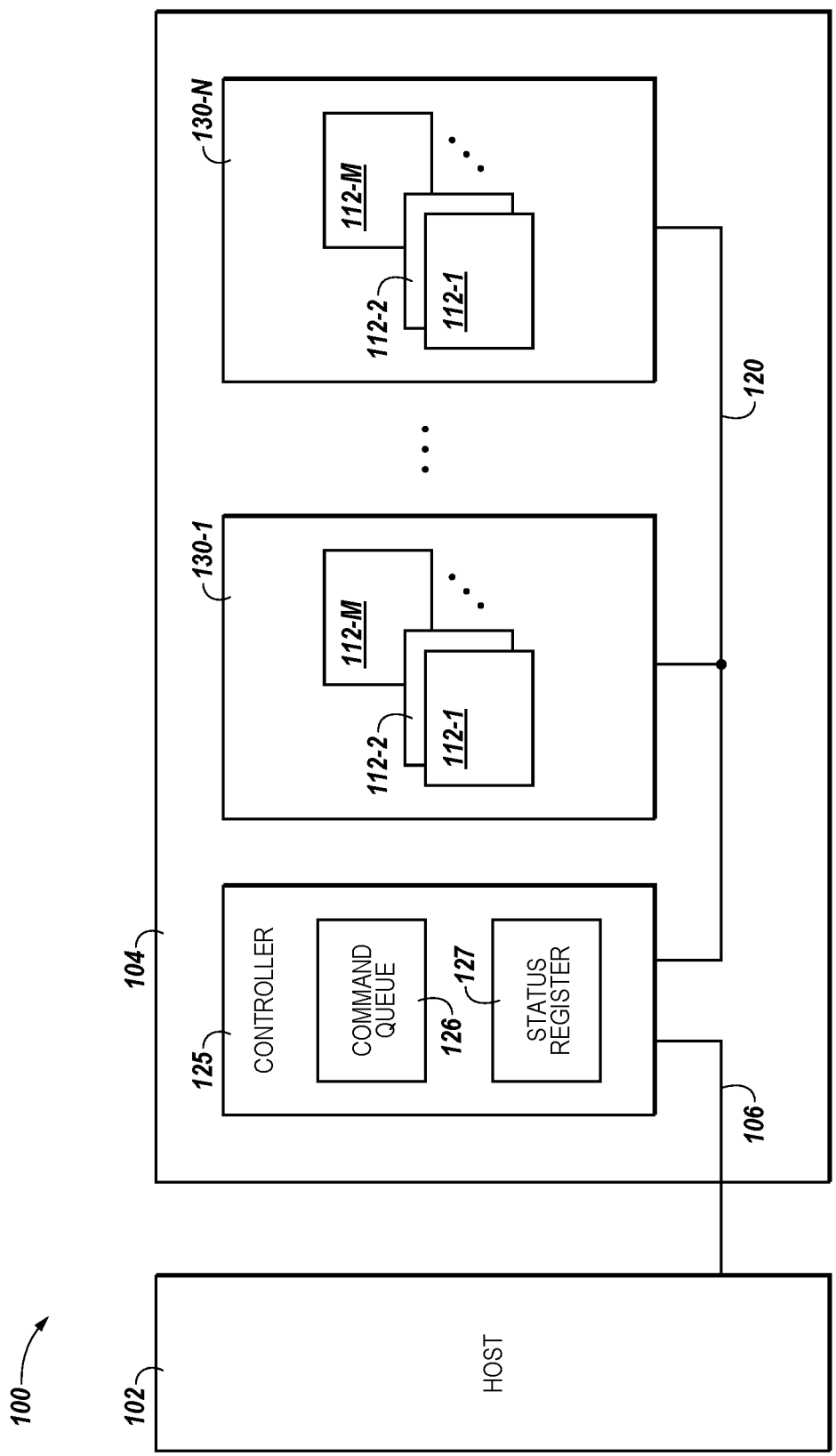
FIG. 1 is a block diagram of an apparatus in the form of a computing system including a memory system in accordance with a number of embodiments of the present disclosure.

The present disclosure includes apparatuses and methods for command queuing. A number of embodiments include receiving a queued command request at a memory system from a host, sending a command response from the memory system to the host that indicates the memory system is ready to receive a command in a command queue of the memory system, and receiving, in response to sending the command response, a command descriptor block for the command at the memory system from the host.

A number of embodiments of the present disclosure can incorporate command queuing and concurrent command execution for commands that are controlled using embedded MultiMediaCard (e.MMC) protocol. A new command class can be introduced and added to the commands in the e.MMC protocol to allow for command queuing and concurrent command execution while using e.MMC protocol. A queued command request command, e.g., CMD 43, a ready to transfer command, e.g., CMD 44, a task management function request command, e.g., CMD 45, a receive data command, e.g., CMD 46, and a send data command, e.g., CMD 47, can be added as a command class to the e.MMC protocol. These commands can be incorporated into the e.MMC protocol to allow for command queuing and concurrent command execution with minor changes to the e.MMC state machine of the memory system or with just adding one state change to the e.MMC state machine of the memory system.

As used herein, "a number of something can refer to one or more such things. For example, a number of memory cells can refer to one or more memory cells. Additionally, the designators "M" and "N", as used herein, particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits. For example, 104 may reference element "04" in FIG. 1, and a similar element may be referenced as 204 in FIG. 2.

FIG. 1 is a block diagram of an apparatus in the form of a computing system 100 including a memory system 104 in accordance with a number of embodiments of the present disclosure. As used herein, a memory system 104, a controller 125, or a memory device 130-1, . . . , 130-N might also be separately considered an "apparatus". The memory system 104 can be any of a number of memory systems, such as a memory card, and can include a host interface 106, a controller 125, and a plurality memory devices 130-1, . . . , 130-N, e.g., solid state memory devices such as NAND flash devices, which provide storage volumes for the memory system 104. The memory system 104 can be communicatively coupled to a host 102 via a host interface 106, such as a backplane or bus.

Examples of hosts 102 can include laptop computers, personal computers, digital cameras, digital recording and playback devices, mobile telephones, PDAs, memory card readers, and interface hubs, among other host systems. The memory system 104 can be part of a cloud storage networking infrastructure, for example, that is coupled to host 102 via host interface 106, which can include a serial advanced technology attachment (SATA), peripheral component interconnect express (PCIe), a universal serial bus (USB), a fiber channel, or an Ethernet connection, among other connectors and interfaces. In general, however, host interface 106 can provide an interface for passing control, address, data, and other signals between the memory system 104 and the host 102 on a command line and/or data bus, for example.

Host 102 can include a number of processors, e.g., parallel processors, co-processors, etc., communicatively coupled to a memory and bus control. The number of processors can be a number of microprocessors, or some other type of controlling circuitry, such as a number of application-specific integrated circuits (ASICs), for example. Other components of the computing system 100 may also have processors. The memory and bus control can have memory and other components directly communicatively coupled thereto, for example, dynamic random access memory (DRAM), graphic user interface, and/or other user interface, e.g., display monitor, keyboard, mouse, etc.

The controller 125 can communicate with the memory, e.g., memory devices 130-1 to 130-N, to control data read, write, and erase operations, among other operations. The controller 125 can include, for example, a number of components in the form of hardware and/or firmware, e.g., one or more integrated circuits/logic, and/or software for controlling access to the memory and/or for facilitating data transfer between the host 102 and memory.

In the example illustrated in FIG. 1, the controller 125 includes a command queue 126 and a status register 127. However, the controller 125 can include various other components not illustrated so as not to obscure embodiments of the present disclosure. Also, although the command queue 126 and the status register 127 are illustrated as resident on the controller 125, in some embodiments, the command queue 126 and the status register 127 may reside elsewhere in the system 100, e.g., as an independent component or resident on a different component of the system.

The command queue 126 can include a number of commands that have been received by the memory system 104 from the host 102 for execution. The command queue 126 can include the information associated with the command that is contained in a command descriptor block for each of the commands in the command queue 126. The status register 127 can be a register that stores status information, such as task dormant, task enabled, task completed, task error, and/or task aborted, for example, for each of the commands in the command queue 126. The command queue 126 and the status register 127 can include volatile memory cells, such as DRAM memory cells, for example, and/or non-volatile memory, such as Flash, RRAM, MRAM, STTRAM, and/or PCRAM memory cells, for example to store the information associated with the commands. The data received from the host during execution of the commands in the command queue 126 can have an error correction code (ECC) operation performed on the data by an ECC module prior to being stored in the memory devices 130-1 to 130-N.

The memory system 104 includes a bus 120 to send/receive various signals and/or commands, e.g., data signals, control signals, and/or address signals, etc., between the memory devices 130-1, . . . , 130-N and the controller 125. Although the example illustrated in FIG. 1 includes a single bus 120, the memory system 104 can include a number of buses, e.g. channels, such as a number of separate data buses, control buses, and/or address buses, in some embodiments. The bus 120 is shared by the plurality of memory devices 130-1, . . . , 130-N and can have various types of bus structures including, but not limited to, bus structures related to Open NAND Flash Interface (ONFI). Also the bus 120 can include various types of bus structures, including, but not limited to Compact Flash Interface, Multimedia Card (MMC), Secure Digital (SD), consumer electronics advanced technology attachment (CE-ATA), Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI). The bus 120 can be a hardwired shared physical bus, for instance.

The computing system 100 illustrated in FIG. 1 is one example of such a system; however, embodiments of the present disclosure are not limited to the configuration shown in FIG. 1.

As illustrated in FIG. 1, the memory devices 130-1, . . . , 130-N can comprise a number of dies and/or chips that can include a number of memory arrays 112-1, 112-2, . . . , 112-M providing storage volumes for the memory system 104. The memory arrays 112-1, 112-2, . . . , 112-M can include peripheral circuitry thereon. In a number of embodiments, the memory arrays 112-1, 112-2, . . . , 112-M can be the minimum component of memory system 104 capable of independently executing commands from and/or sending status to the host 102 via host interface 106. The memory arrays 112-1, 112-2, . . . , 112-M can include Flash memory arrays having a NAND architecture, for example. However, embodiments are not limited to a particular type of memory array or array architecture and could include memory arrays having RRAM, MRAM, STTRAM, and/or PCRAM memory cells.

The embodiment illustrated in FIG. 1 can include additional circuitry, logic, and/or components not illustrated so as not to obscure embodiments of the present disclosure. For example, memory devices 130-1, . . . , 130-N can include address circuitry to latch address signals provided over I/O connectors through I/O circuitry. Signals can be received and decoded by a row decoder and a column decoder, to access memory system 102.

Figure 2:
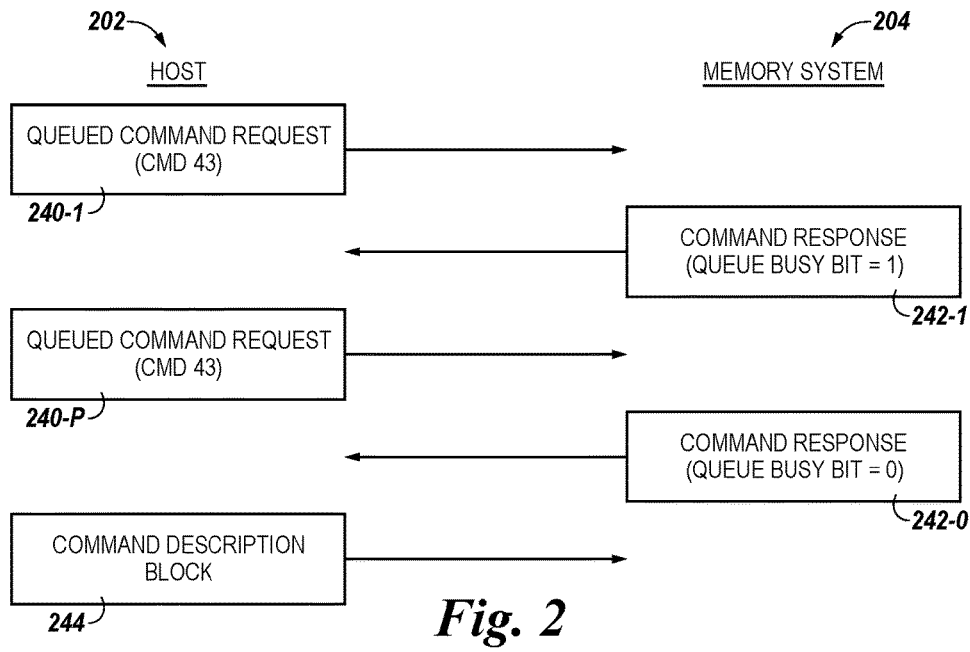
FIG. 2 illustrates examples of a method for command queuing in a memory system in accordance with a number of embodiments of the present disclosure.

FIG. 2 illustrates examples of a method for command queuing in a memory system in accordance with a number of embodiments of the present disclosure. In FIG. 2, a queued command request 240-1, e.g., CMD 43, can be sent from a host 202 to a memory system 204. The queued command request 240-1 can indicate to the memory system 204 that the host 202 would like to send a command to the memory system 204 for the memory system 204 to add to the command queue in the memory system 204. The memory system 204 can send a command response 242-1 to the host, in response to receiving the queued command request. The command response 242-1 can include a queue busy bit that is set to one (1), indicating that memory system 204 is not ready to receive commands in the command queue, e.g., the command queue is full. When the host 202 receives command response 242-1 with a queue busy bit set to one (1), the host 202 does not send a command block descriptor back to the memory system 204. In a number of embodiments, the host 202 can send a number of queued command requests to the memory system 204 until the memory system 204 sends back a command response with a queue busy bit set to zero (0). For example, after a period of time, the host 202 can send another queued command request 240-P to the memory system 204, which includes the same information as queued command request 240-1. If the command queue in the memory system 204 is ready to receive commands to add to the command queue, the memory system 204 can send command response 242-0 with the queue busy bit set to zero (0) to the host 202, which indicates that the memory system 204 is ready to add commands to the command queue. The host 202 sends command descriptor block 244 to the memory system 204 and the memory system 204 places the command described in the command descriptor block 244 in the command queue. The command descriptor block 244 includes information regarding the command that enables the host 202 and the memory system 204 to execute the command when they are ready to execute commands.

In a number of embodiments, the host 202 can send a task management function request command, e.g., CMD 45, to the memory system 204. The task management function request command can be used to check a status register, e.g. status register 127 in FIG. 1, to determine the status of each of the command in the command queue, e.g., command queue 126 in FIG. 1. The memory system 204 can return the status of each of the commands in the command queue to the host 202. In a number of embodiments, the task management function request command can also be sent from the host 202 to the memory system 204 with an indication to abort the command queue, whereby each of the commands in the command queue are aborted by the memory system 204. Also, a stop command, e.g., CMD 12 and/or a high priority interrupt (HPI) command can be sent from the host 202 to the memory system 204, which will cause the memory system 204 to abort the command queue.

In a number of embodiments, a number of commands can be added to the command queue when the host sends a number of queued command requests to the memory system and then a number of command descriptor blocks to the memory system in response to receiving a number of command responses indicating that the command queue is ready to receive commands. The number of queued command requests can be received from the host on a command line, so that queued command requests can be received by the memory system and responded to by the memory system while commands from the command queue are being executed in the memory system on a data bus.

Figure 3:
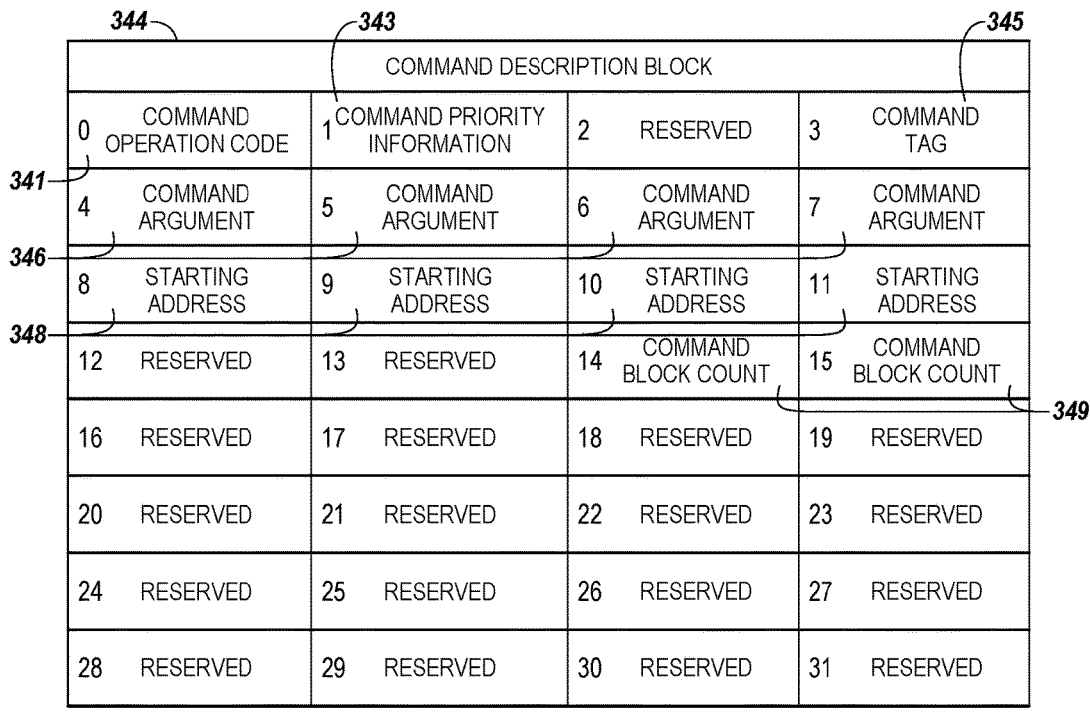
FIG. 3 illustrates an example of a command block descriptor in accordance with a number of embodiments of the present disclosure.

FIG. 3 illustrates an example of a command block descriptor 344 in accordance with a number of embodiments of the present disclosure. In FIG. 3, the command block descriptor 344 includes a number of fields that provide information associated with a command so the command can be placed in a command queue and executed according to the information contained in command block descriptor 344. A command block descriptor can include 32 bytes, for example, among other numbers of bytes. In this example, command block descriptor 344 can include 32 bytes, where byte0 is associated with a command operation code 341, byte1 is associated with command priority information 343, byte2 is reserved, byte3 is associated with a command task tag 345, bytes4 to 7 are associated with the command argument 346, bytes8 to 11 are associated with the command starting address 348, bytes12 to 13 are reserved, bytes 14 to 15 are associated with the command block count 349, and bytes16 to 31 are reserved. By way of example, the command operation byte 341 can be set to a value of 01h, corresponding to a read command. The command operation byte 341 can be set to a value of 02h, corresponding to a write command. The command priority information 343 can indicate an order of priority for execution in the command queue. The command priority information 343 byte can be set to a value of 00h, which corresponds to a simple priority where the command is placed in the command queue without priority. The command priority information 343 byte can be set to a value of 01h, which corresponds to an ordered priority where the command is placed in the command queue so that the command is executed chronologically based on when the memory system received the command. The command priority information 343 byte can be set to a value of 02h, which corresponds to a head-of-queue priority where the command is the next executed command. The command task tag 345 byte can correspond to a unique identifier that is used to distinguish the command from other commands in the command queue. The command task tag byte 345 can be set to values ranging from 00h to FFh. The command argument 346, e.g., a reliable write or a forced programming request, command starting address 348, and the command block 349 count can be set to values according to e.MMC protocol.

In a number of embodiments, the command descriptor block can include any number of bytes, e.g. less than 32 bytes. For example, when some information, such as command priority, command tag, task attribute, command argument, and/or block count, among other information, is included in the queued command request, the command descriptor block can includes less than 32 bytes.

Figure 4A:
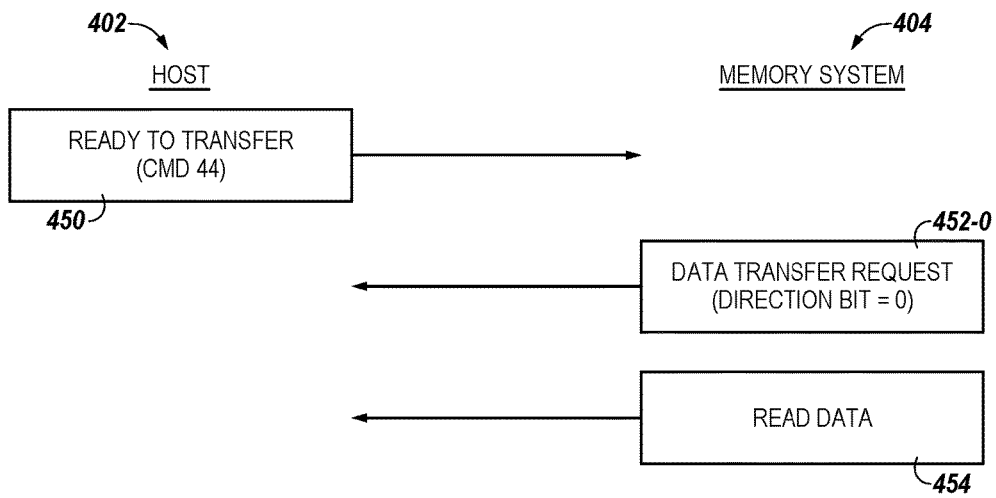
FIGS. 4A-D illustrate examples of a method for executing commands in a command queue in a memory system in accordance with a number of embodiments of the present disclosure.

FIGS. 4A-D illustrate examples of a method for executing commands in a command queue in a memory system 404 in accordance with a number of embodiments of the present disclosure. In FIG. 4A, once the host 402 has sent one or more commands to the command queue in the memory system 404, the host 402 can send a ready to transfer command 450, e.g., CMD 44, to the memory system 404 when the host 402 is ready to transmit or receive data. The memory system 404 can send data transfer request 452-0 to the host 402 in response to receiving the ready to transfer command 450. The data transfer request 452-0 can correspond to a command in the command queue that is ready for execution next. In a number of embodiments, a data transfer request may provide a negative response and not request a data transfer if the memory system 404 is not ready to send or receive data. In a number of embodiments, the data transfer request may be delivered using the command/response signal and not using the data bus. The data transfer request 452-0 can include a direction bit that indicates the direction of data transfer when execution the command. For example, a direction bit that is set to 1 indicates that the command is a write command where data is sent from the host to the memory system. The data transfer request 452-0 can include a command tag field to identify which command from the command queue is being executed and can also include a data offset field and a data size field to indicate which portions of the data should be transferred. In FIG. 4A, data transfer request 452-0, sent in response to receiving the ready to transfer command, includes a direction bit set to 0, which indicates that the command is a read command where data is sent from the memory system to the host. The direction bit that is set to 0 in the data transfer request 452-0 allows the memory system 404 to maintain control of the bus and send the read data requested in the command from the memory system 404 to the host 402. The memory system 404 remains in a Sending Data state when the direction bit of the data transfer request is set to 0, therefore, in a number of embodiments, a data transfer request with a direction bit set to 0 does not cause a state change in the memory system 404. In a number of embodiments, the memory system can be configured so that the memory system 404 remains in a Sending Data state when the memory system 404 sends a data transfer request with a direction bit set to 0.

Figure 4B:
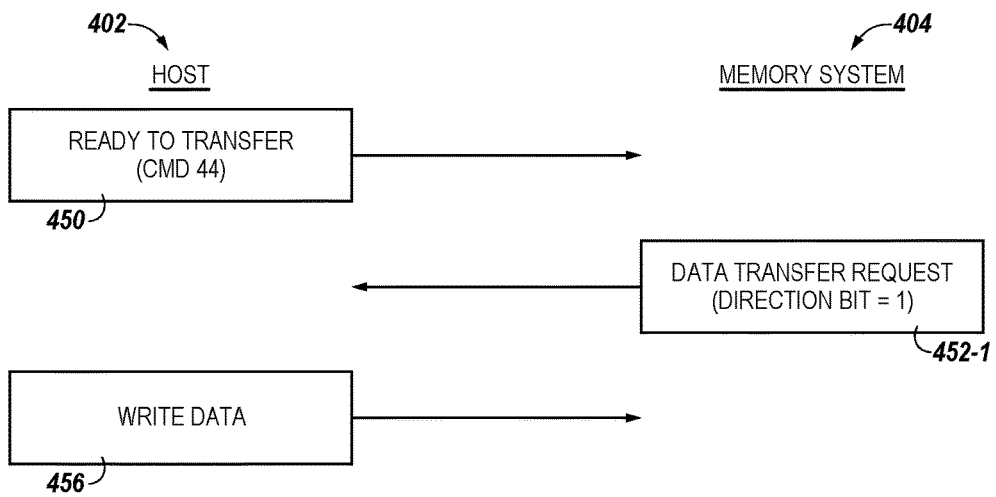

In FIG. 4B, once the host 402 has sent one or more commands to the command queue in the memory system 404, the host 402 can send a ready to transfer command 450, e.g., CMD 44, to the memory system 404 when the host 402 is ready to transmit or receive data. The memory system 404 can send a data transfer request 452-1, which includes a direction bit to indicate the direction of data transfer during execution of the command, to the host 402 in response to receiving the ready to transfer command 450. In a number of embodiments, a data transfer request may provide a negative response and not request a data transfer if the memory system 404 is not ready to send or receive data. In a number of embodiments, the data transfer request may be delivered using the command/response signal and not using the data bus. In FIG. 4B, data transfer request 452-1, sent in response to receiving the ready to transfer command, includes a direction bit set to 1, which corresponds to a write command. The data transfer request 452-1 can include a command tag field to identify which command from the command queue is being executed and can also include a data offset field and a data size field to indicate which portions of the data should be transferred. The direction bit that is set to 1 in the data transfer request 452-1 allows the host 402 to take control of the bus and send the write data requested in the command from the host 402 to the memory system 404. The memory system 404 transitions from a Sending Data state to a Receive Data state when the direction bit of the data transfer request 452-1 is set to the 1. In a number of embodiments, the state machine of the memory system can be configured so that the memory system 404 changes from a Sending Data state to a Receiving Data state when the memory system 404 sends a data transfer request with a direction bit set to 1.

Figure 4C:
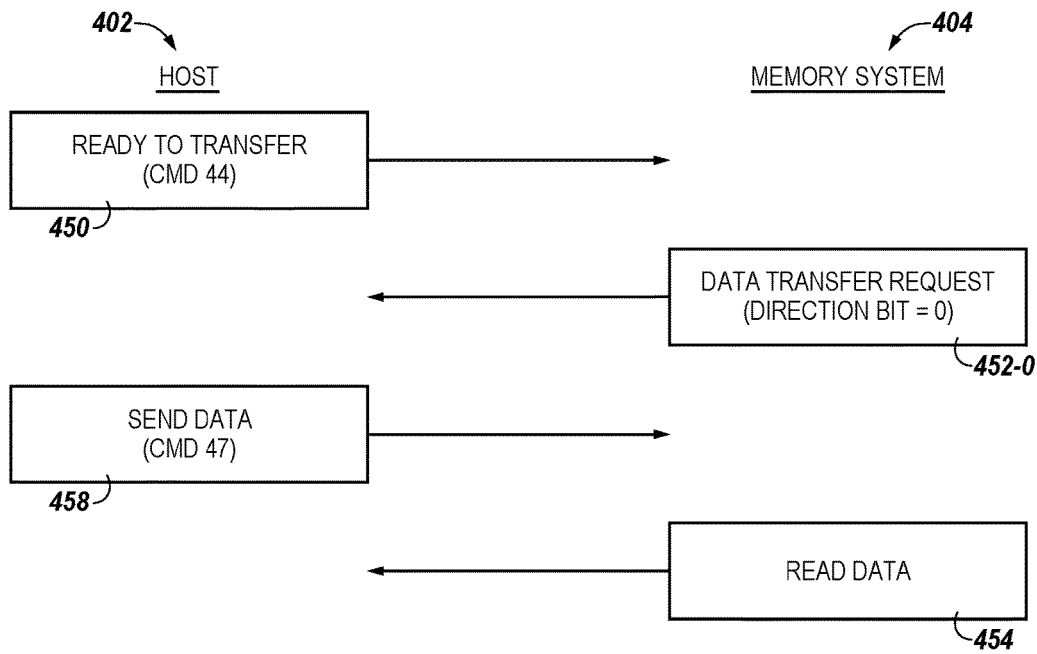

In FIG. 4C, once the host 402 has sent one or more commands to the command queue in the memory system 404, the host 402 can send a ready to transfer command 450, e.g., CMD 44, to the memory system 404 when the host 402 is ready to transmit or receive data. The memory system 404 can respond with a data transfer request 452-0, which includes a direction bit to indicate the direction of data transfer during execution of the command, to the host 402 in response to receiving the ready to transfer command 450. In a number of embodiments, a data transfer request may provide a negative response and not request a data transfer if the memory system 404 is not ready to send or receive data. In a number of embodiments, the data transfer request may be delivered using the command/response signal and not using the data bus. In FIG. 4C, data transfer request 452-0 that was sent in response to receiving the ready to transfer command 450 includes a direction bit set to 0, which corresponds to a read command. The data transfer request 452-0 can include a command tag field to identify which command from the command queue is being executed and can also include a data offset field and a data size field to indicate which portions of the data should be transferred. In response to receiving the data transfer request 452-0 with a direction bit set to 0, the host 402 sends a send data command 458, e.g. CMD 47, to the memory system 404. The send data command 458 requests memory system 404 to send data to the host 402, therefore the memory system 404 transitions from a Transfer state to a Sending Data state and memory system 404 takes control of the bus and sends the read data requested in the command from the memory system 404 to the host 402. When all data has been transferred, the memory system 404 moves back from the Sending Data state to the Transfer state. In a number of embodiments, the state machine of the memory system can be configured so that the memory system 404 changes from a Sending Data state to a Transfer state after sending the transfer data request 452-0 and then changes from the Transfer state to a Sending Data state when the memory system 404 receives the send data command 458 from the host.

Figure 4D:
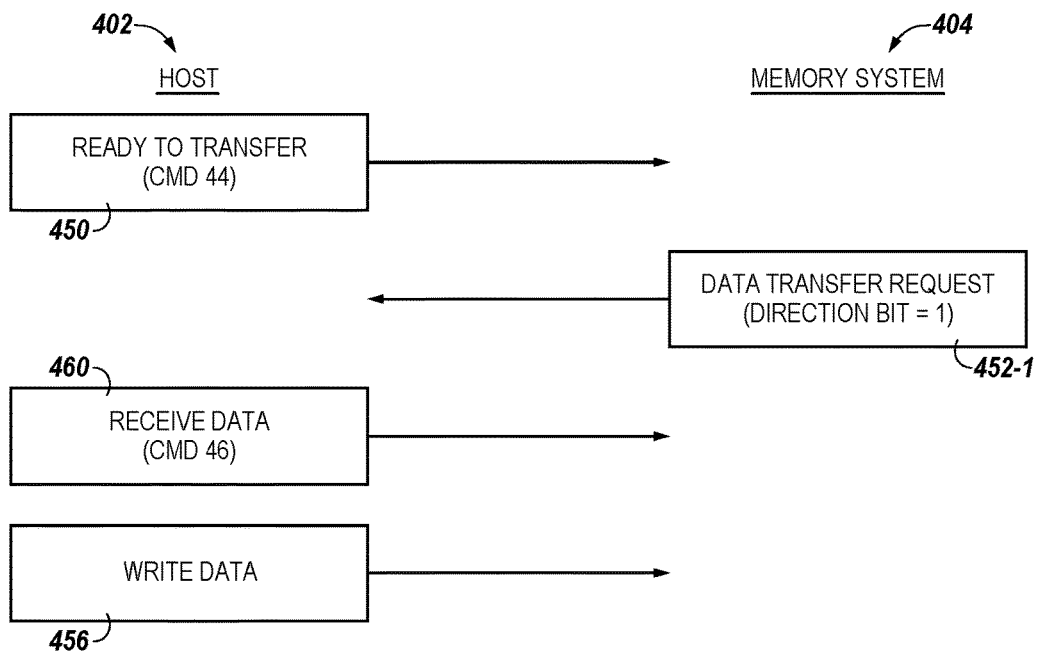

In FIG. 4D, once the host 402 has sent one or more commands to the command queue in the memory system 404, the host 402 can send a ready to transfer command 450, e.g., CMD 44, to the memory system 404 when the host 402 is ready to transmit or receive data. The memory system 404 can send data transfer request 452-1, which includes a direction bit to indicate the direction of data transfer during execution of the command, to the host 402 in response to receiving the ready to transfer command 450. In a number of embodiments, a data transfer request may provide a negative response and not request a data transfer if the memory system 404 is not ready to send or receive data. In a number of embodiments, the data transfer request may be delivered using the command/response signal and not using the data bus. In FIG. 4D, data transfer request 452-1 that was sent in response to receiving the ready to transfer command 450 includes a direction bit set to 1, which corresponds to a write command. The data transfer request 452-1 can include a command tag field to identify which command from the command queue is being executed and can also include a data offset field and a data size field to indicate which portions of the data should be transferred. In response to receiving the data transfer request 452-1 with a direction bit set to 1, the host 402 sends a receive data command 460, e.g. CMD 46, to the memory system 404. The receive data command 460 indicates to the memory system 404 that the memory system 404 will be receiving data from the host 402, therefore the memory system 404 transitions from a Transfer state to a Receiving Data state and memory system 404 allows the host 402 to take control of the bus and send the write data requested in the command from the host 402 to the memory system 404. When all data have been transferred, the memory system 404 moves back from the Receiving Data state to the Transfer state.

In a number of embodiments, the state machine of the memory system can be configured so that the memory system 404 changes from a Sending Data state to a Transfer state after sending the transfer data request and then changes from the Transfer state to a Receiving Data state when the memory system 404 receives the receive data command 460 from the host 402.

In a number of embodiments, when an error occurs during the execution of a command, the command fails. The memory system can respond to additional queued command requests from the host with a command response with error bits indicating that there was an error during execution of a command. The host can also query the memory system with a task management function request command to receive an update on the status of the commands in the command queue.

FIG. 5 illustrates an example of a data transfer request header 552 included in a data transfer request in accordance with a number of embodiments of the present disclosure. In FIG. 5, the data transfer request header 552 includes a number of fields that provide information associated with a command so the command can be identified by the host and executed by the host and memory device. A data transfer request header can include 32 bits, for example, among other numbers of bits. Data transfer request header 552 includes 32 bytes, where bytes 0 to 1 are reserved, byte 2 is associated with a transfer direction 551, byte 3 is associated with a command task tag 545, bytes4 to 11 are reserved, bytes12 to 13 are associated with the data buffer offset 553, bytes14 to 15 are associated with the command transfer length 555, bytes16 to 31 are reserved. The transfer direction 551 byte can be set to a value of 00h, corresponding to a read command. The transfer direction 551 byte can be set to a value of 01h, corresponding to a write command. The command task tag 545 byte can correspond to a unique identifier that is used to distinguish and identify the command from other commands in the command queue that will be executed. The command task tag 545 byte can be set to values ranging from 00h to FFh. The data buffer offset 553 can be an offset of a data transfer within the complete data transfer of a task. The data transfer request 552 may be composed of any number of bytes. For example, the data transfer request may be composed of less than 32 bytes when the data transfer request is delivered using the command/response signal, even if including the same fields previously described.

Figure 6:
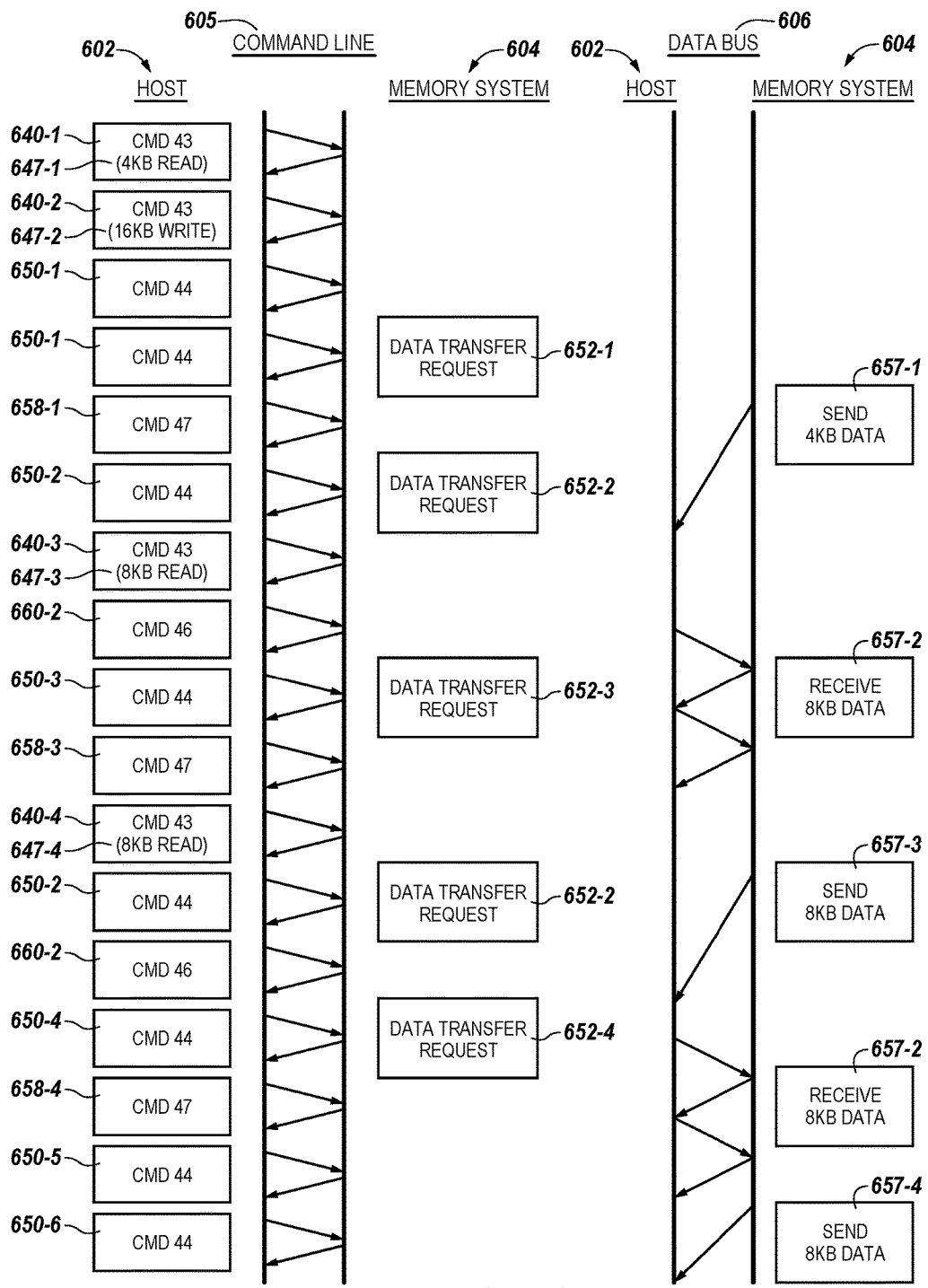
FIG. 6 illustrates an example of a method for command queuing and execution in a memory system in accordance with a number of embodiments of the present disclosure.

FIG. 6 illustrates an example of a method for command queuing and execution in a memory system in accordance with a number of embodiments of the present disclosure. The method illustrated in FIG. 6 includes a number of commands that are executed concurrently, where commands and command responses are sent between a host and a memory system on a command line, while data associated with the commands is being transferred between the memory system and the host on a data bus. Therefore, in a number of embodiments, the data bus can be controlled by the host or the memory system based on the commands that are sent on the command line and the data bus can be in use transferring data between the host and the memory device while commands are being sent on the command line. For example, a command can be added to the command queue via commands that are sent between the host and memory system while data associated with commands in the command queue is sent between the host and the memory system on the data bus.

In FIG. 6, a first queued command request 640-1, e.g., CMD 43, associated with a first command 647-1 is sent from the host 602 to the memory system 604. The first command 647-1 is a 4KB read command. In response, the memory system 604 can send a command response (not shown) and the host 602 can send a command block descriptor (not shown) for the first command so the first command 647-1 can be added to the command queue.

A second queued command request 640-2, e.g., CMD 43, associated with a second command 647-2 is sent from the host 602 to the memory system 604. The second command 647-2 is 16KB write command. In response, the memory system 604 can send a command response (not shown) and the host 602 can sent a command block descriptor (not shown) for the second command so the second command 647-2 can be added to the command queue. The command queue now has two commands, the first command 647-1 and the second command 647-2, ready for execution.

A ready to transfer command 650-1, e.g. CMD 44, is sent from the host 602 to the memory system 604 on the command line 605. In FIG. 6, the memory system 604 is not ready to execute a command and sends a command response indicating such to the host 602. The host 602, after a time period, then sends the ready to transfer command 650-1, e.g., CMD 44, to the memory system 604 again. The memory system 604 responds to the ready to transfer command 650-1 with data transfer request 652-1 identifying the command, 4KB read command 647-1, and the direction of data transfer. The host 602, in response to receiving the data transfer request 652-1, sends a send data command 658-1, e.g., CMD 47, causing the memory system 604 to take control of the data bus 606 and send 4KB of data 657-1 associated with the first command 647-1.

While the 4KB of data associated with the first command 647-1 is being sent from the memory system 604 to the host 602 on the data bus 606, a ready to transfer command 650-2, e.g. CMD 44, and a third queued command request 640-3, e.g., CMD 43, associated with a third command 647-3 is sent from the host 602 to the memory system 604 on the command line 605. The third command 647-3 is added to the command queue when the memory system 604 sends a command response (not shown) to the third queued command request 640-3 and the host 602 can send a command block descriptor (not shown) for the third command so the third command 647-3 can be added to the command queue. The memory system 604 responds to the ready to transfer command 650-2 with data transfer request 652-2 identifying the second command 647-2, a 16KB write command, the direction of data transfer, and the portion of the data to be transferred, e.g. data offset and data size. The host 602, in response to receiving data transfer request 652-2, sends a receive data command 660-2, e.g., CMD 46, causing the host 602 to take control of the data bus 606 and send 8KB of data 657-2 associated with the second command 647-2 to the memory system 604.

While the 8KB of data associated with the second command 647-2 is being sent from the host 602 to the memory system 604 on the data bus 606, a ready to transfer command 650-3, e.g. CMD 44, is sent from the host 602 to the memory system 604 on the command line 605. The memory system 604 responds to the ready to transfer command 650-3 by sending data transfer request 652-3 on the command line 605 identifying the third command 647-3, a 8KB read command, and the direction of data transfer. The priority indicated in the third command 647-3 was higher priority than command 647-2, therefore the command 647-3 is executed next and the execution of the second command 647-2 is paused, e.g. with only 8KB of the 16KB associated with the second command 647-2 having been sent from the host 602 to the memory system 604, while the third command is executed. The host 602, in response to receiving data transfer request 652-3, sends a send data command 658-3, e.g., CMD 47, causing the memory system 604 to take control of the data bus 606 and send 8KB of data 657-3 associated with the third command 647-3.

A fourth queued command request 640-4, e.g., CMD 43, associated with a fourth command 647-4 is sent from the host 602 to the memory system 604. The fourth command 647-4 is 8KB read command. In response, the memory system 604 can send a command response (not shown) and the host 602 can send a command block descriptor (not shown) for the fourth command so the fourth command 647-4 can be added to the command queue. The command queue now has three commands, the second command 647-2, which has been partially executed, and the third command 647-3, which is being executed, and the fourth command 647-4, which is ready for execution.

While the 8KB of data associated with the third command 647-3 is being sent from the memory system 604 to the host 602 on the data bus 606, ready to transfer command 650-2, e.g. CMD 44, is again sent from the host 602 to the memory system 604 on the command line 605, so that execution of the second command 647-2 may resume. The memory system 604 responds to the ready to transfer command 650-2 with data transfer request 652-2 identifying the second command 647-2, a 16KB write command, the direction of data transfer, and the portion of the data to be transferred, e.g., data offset and data size. The host 602, in response to receiving data transfer request 652-2, sends a receive data command 660-2, e.g., CMD 46, causing the host 602 to take control of the data bus 606 and send 8KB of data 657-2 associated with the second command 647-2 to the memory system 604 to complete execution of the second command 647-2.

While the 8KB of data associated with the second command 647-2 is being sent from the host 602 to the memory system 604 on the data bus 606, a ready to transfer command 650-4, e.g. CMD 44, is sent from the host 602 to the memory system 604 on the command line 605. The memory system 604 responds to the ready to transfer command 650-4 with data transfer request 652-4 identifying the fourth command 647-4, a 8KB read command, and the direction of data transfer. The host 602, in response to receiving data transfer request 652-4, sends a send data command 658-4, e.g., CMD 47, causing the memory system 604 to take control of the data bus 606 and send 8KB of data 657-4 associated with the fourth command 647-4.

The host 602 sends ready to transfer commands 650-5 and 650-6 to the memory system 604, but the command queue is empty, so the memory system 604 sends a command response (not shown) to the host 602 indicating that the command queue is empty and/or the memory system 604 does not send a data transfer request in response to command 650-5 and 650-6.

Although specific embodiments have been illustrated and described herein, those of ordinary skill in the art will appreciate that an arrangement calculated to achieve the same results can be substituted for the specific embodiments shown. This disclosure is intended to cover adaptations or variations of a number of embodiments of the present disclosure. It is to be understood that the above description has been made in an illustrative fashion, and not a restrictive one. Combination of the above embodiments, and other embodiments not specifically described herein will be apparent to those of ordinary skill in the art upon reviewing the above description. The scope of a number of embodiments of the present disclosure includes other applications in which the above structures and methods are used. Therefore, the scope of a number of embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method for command queuing in a computing system, comprising:
   receiving a first queued command request at a memory system from a host, wherein the first queued command request indicates to the memory system that the host would like to send a command from the host to the memory system to add to a command queue of the memory system;
   sending a first command response from the memory system to the host that indicates the memory system is not ready to receive the command in the command queue of the memory system;
   receiving a task management function request command from the host;
   sending a status of each of the commands in the command queue to the host in response to receiving the task management function request command;
   receiving a second queued command request at the memory system from the host;
   sending a second command response from the memory system to the host that indicates the memory system is ready to receive the command in the command queue of the memory system; and
   receiving, in response to sending the second command response, a command descriptor block for the command at the memory system from the host; and
   placing, in response to receiving the command descriptor block, the command described by the command descriptor block in the command queue of the memory system.

2. The method of claim 1, wherein the command descriptor block includes priority information for the command.

3. The method of claim 2, wherein the priority information includes a parameter that indicates the command is placed in the command queue with highest priority for execution.

4. The method of claim 2, wherein the priority information includes a parameter that indicates the command is placed in the command queue with chronological priority for execution.

5. The method of claim 2, wherein the priority information includes a parameter that indicates the command is placed in the command queue without priority for execution.

6. The method of claim 1, wherein the command descriptor block for the command includes a command operation code, priority information, a task tag, a command argument, a starting address, and a block count.

7. The method of claim 1, wherein the method includes receiving the queued command request at the memory system when the memory system is in a Transfer state.

8. The method of claim 1, wherein the method includes changing the memory system from a Transfer state to a Receiving state in response to sending the command response.

9. The method of claim 1, wherein the method includes command queuing using an embedded MultiMediaCard (e.MMC) protocol.

10. The method of claim 1, wherein the method includes executing the command by receiving a ready to transfer commands at the memory system from the host.

11. A method for command execution in a memory system, comprising:
receiving a first number of queued command requests at a memory system from a host, wherein the first number of queued command requests indicate to the memory system that the host is ready to send a first number of commands for the memory system to include in a command queue in the memory system;
placing the first number of commands in a command queue in the memory system in response to receiving the first number of queued command requests; and
executing one of the first number of commands in the command queue on the memory system by receiving a ready to transfer command at the memory system from a host, wherein the ready to transfer command indicates the host is ready to transmit or receive data; sending a first data transfer request from the memory system to the host in response to receiving the ready to transfer command, wherein the first data transfer request indicates the memory system is not ready to send or receive data; and sending a second data transfer request from the memory system to the host in response to receiving the ready to transfer command, wherein the second data transfer request includes a data packet with information, including a direction of transfer bit, allowing for command execution of the command in the command queue by the host and memory system.

12. The method of claim 11, wherein executing the command includes receiving a receive data command at the memory system from the host when the command is a write command.

13. The method of claim 12, wherein, in response to receiving the receive data command from the host, the memory system transitions to a Receive state and the host sends data to the memory system.

14. The method of claim 11, wherein executing the command includes receiving a send data command at the memory system from the host when the command is a read command.

15. The method of claim 14, wherein, in response to receiving the send data command from the host, the memory system transitions to a Sending Data state and the memory system sends data to the host.

16. A method for command execution in a memory system, comprising:
executing a first number of commands in a command queue on the memory system by receiving a first number of ready to transfer commands at the memory system from a host and sending a first number of data transfer requests from the memory system to the host in response to receiving the first number of ready to transfer commands, wherein a first portion of the first number of data transfer requests indicate the memory system is not ready to send or receive data and a second portion of the first number of data transfer requests each includes a data packet with information, including a direction of transfer bit, allowing for command execution of commands in the command queue by the host and memory system; and
interrupting the execution of the first number of commands and executing a command from a second number of commands in response to the command from the second number of commands being placed in the command queue with a parameter that indicates the command is placed in the command queue with highest priority for execution.

17. The method of claim 16, wherein the method includes executing the command from the second number of commands by receiving a ready to transfer command at the memory system from the host and sending a data transfer request from the memory system to the host in response to receiving the ready to transfer command, wherein the data transfer request includes a data packet with information allowing for command execution on the host and memory system.

18. The method of claim 16, wherein the method includes receiving the second number of a queued command requests at the memory system from the host on a command line while at least a portion of the first number of commands are being executed via data transfers on a data bus.

19. The method of claim 16, the method includes executing two or more of the first number of commands concurrently.

20. The method of claim 16, the method includes resuming execution of the first number of commands after execution of the command from the second number of commands has commenced.

* * * * *